United States Patent
Wu et al.

(10) Patent No.: US 8,990,241 B2
(45) Date of Patent: Mar. 24, 2015

(54) SYSTEM AND METHOD FOR RECOMMENDING QUERIES RELATED TO TRENDING TOPICS BASED ON A RECEIVED QUERY

(75) Inventors: Huming Wu, San Jose, CA (US); Siva Gurumurthy, Sunnyvale, CA (US); Hang Su, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1075 days.

(21) Appl. No.: 12/977,942

(22) Filed: Dec. 23, 2010

(65) Prior Publication Data

US 2012/0166438 A1    Jun. 28, 2012

(51) Int. Cl.
*G06F 17/30*  (2006.01)
*G06F 7/00*   (2006.01)

(52) U.S. Cl.
CPC .................................. *G06F 17/3064* (2013.01)
USPC ........................................ 707/767; 707/752

(58) Field of Classification Search
None
See application file for complete search history.

(56) References Cited

U.S. PATENT DOCUMENTS

| | | | |
|---|---|---|---|
| 2002/0184267 A1* | 12/2002 | Nakao | 707/515 |
| 2004/0260688 A1* | 12/2004 | Gross | 707/3 |
| 2011/0093664 A1* | 4/2011 | Leppard | 711/154 |
| 2012/0197750 A1* | 8/2012 | Batra et al. | 705/26.7 |

* cited by examiner

*Primary Examiner* — Hosain Alam
*Assistant Examiner* — Reza Hosseini
(74) *Attorney, Agent, or Firm* — Pillsbury Winthrop Shaw Pittman LLP (57) ABSTRACT

Systems and methods for identifying candidate queries related to a trending topic based on a user query are described. A trending topic identification module identifies topics trending in one or more real-time content sources. The real-time content source(s) may include, for example, a source of microblog posts or other user-generated data, a news feed, or the like. A query recommendation module suggests at least one candidate query in response to receiving a user query. The query recommendation module obtains the at least one candidate query by comparing words and named entities of the user query with words and named entities associated with the trending topics identified by the trending topic identification module.

21 Claims, 8 Drawing Sheets

SYSTEM AND METHOD FOR RECOMMENDING QUERIES RELATED TO TRENDING TOPICS BASED ON A RECEIVED QUERY

BACKGROUND OF THE INVENTION

1. Field of the Invention

The present invention generally relates to systems and methods for assisting a user in obtaining information from an information retrieval system. More particularly, the present invention relates to systems and methods for identifying and recommending queries related to trending topics based on a query received from a user of an information retrieval system.

2. Background

Generally speaking, an information retrieval system is an automated system that assists a user in searching for and obtaining access to information. A search engine is one type of information retrieval system. A search engine is designed to help users search for and obtain access to information that is stored in a computer system or across a network of computers. Search engines help to minimize the time required to find information as well the amount of information that must be consulted. The most public, visible form of a search engine is a Web search engine which is designed to search for information on the World Wide Web. Some well-known Web search engines include Yahoo!® Search (search.yahoo.com), provided by Yahoo! Inc. of Sunnyvale, Calif., Bing™ (www.bing.com), provided by Microsoft® Corporation of Redmond, Wash., and Google™ (www.google.com), provided by Google Inc. of Mountain View, Calif. Further types of search engines include personal search engines, mobile search engines, and enterprise search engines that search on intranets, among others.

To perform a search, a user of a search engine typically enters a query into a text entry box of the search engine. The query contains one or more words/terms, such as "hazardous waste" or "country music." The terms of the query are typically selected by the user to find particular information of interest to the user. The search engine processes the query and returns a list of documents relevant to the query, often sorted in accordance with a relevancy metric. In a Web-based search, the search engine typically returns a list of uniform resource locator (URL) addresses for the relevant documents, which is displayed to the user in a search results page.

A user of a search engine may submit a query to obtain time-sensitive information about a particular topic (e.g., breaking news, current events, or the like). Such users may also be interested in obtaining information about topics related to the subject matter of their query that are currently becoming popular with others. Such topics may be referred to herein as "trending" topics. However, the search engine may not return information about such trending topics when returning search results based on the original query. As a result, the user may fail to retrieve the desired information. This may be frustrating to the user. Furthermore, if the search engine is a Web search engine, such failure to retrieve desired information on behalf of users can lead to a decline in key metrics associated with the search engine, such as page views, click-through rates, and the like.

BRIEF SUMMARY OF THE INVENTION

Various approaches are described herein for, among other things, identifying and recommending trending query candidates associated with a received query, such as but not limited to a query received from a user of a search engine. The trending query candidates comprise queries that are intended to assist a user in retrieving information about topics related to the subject matter of the original received query that are currently becoming popular with others.

For example, a system for identifying candidate queries related to a trending topic is described herein. The system includes a trending topic identification module and a query recommendation module. The trending topic identification module is configured to identify topics trending in one or more real-time content sources. The real-time content source(s) may include, for example, a source of microblog posts or other user-generated data, a news feed, or the like. The query recommendation module is configured to suggest at least one candidate query in response to receiving a user query. The query recommendation module is configured to obtain the at least one candidate query by comparing words and named entities of the user query with words and named entities associated with the trending topics identified by the trending topic identification module.

A method for identifying candidate queries related to a trending topic based on a user query is also described herein. In accordance with the method, a data structure is generated that includes entries relating trending topics from one or more real-time content sources with words and named entities located in the content of the real-time content source(s). The generated data structure is stored in a database accessible to a query recommendation module. A user query is then received at the query recommendation module. The content of the received user query is matched to one or more of the trending topics stored within the database. One or more named entities associated with the matched one or more trending topics are then retrieved and returned to serve as the candidate queries related to the trending topic.

A computer program product is also described herein. The computer program product comprises a computer-readable storage medium having computer program logic recorded thereon for enabling a processing unit to identify candidate queries related to a trending topic based on a user query. The computer program logic comprises first means, second means, third means and fourth means. The first means are for enabling the processing unit to receive a user query. The second means are for enabling the processing unit to match contents of the received user query to one or more trending topics stored within a database, the trending topics being identified based on an analysis of content of one or more real-time content sources. The third means are for enabling the processing unit to retrieve one or more named entities stored in association with the matched one or more trending topics. The fourth means are for enabling the processing unit to return the retrieved one or more named entities.

By identifying and recommending trending query candidates based on a received user query, embodiments of the present invention can assist the user of the search engine in obtaining information about topics related to the received user query that are currently becoming popular with others. By helping the user obtain access to such trending topic information, embodiments of the present invention can improve the search experience of the user. Furthermore, by enabling users of Web search engines to retrieve such trending topic information, embodiments of the present invention can improve key metrics associated with the search engine, such as page views, click-through rates, and the like.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, identifying and recommending trending query candidates associated with a given query, such as but not limited to a query received from a user of a search engine. The trending query candidates comprise queries that are intended to assist a user in retrieving information about topics that are related to an original user query and that are currently becoming popular with others. For example, in response to receipt of the user query "Barack Obama" submitted during the 2008 presidential election, the named entity "David Plouffe," (Obama's campaign manager) may be suggested as a candidate query, but in response to the receipt of the user query "Barack Obama" submitted in early 2010, the named entity "Health Care Reform" (the bill passed during that time) may be suggested as a candidate query. That is to say, given a particular user query, query candidates related to topics trending at the time of the query may be identified and suggested to the user.

By identifying and recommending trending query candidates based on a received user query, embodiments of the present invention can assist the user of the search engine in obtaining information about topics related to the received user query that are currently becoming popular with others. By helping the user obtain access to such trending topic information, embodiments of the present invention can improve the search experience of the user. Furthermore, by enabling users of Web search engines to retrieve such trending topic information, embodiments of the present invention can improve key metrics associated with the search engine, such as page views, click-through rates, and the like.

Figure 1:
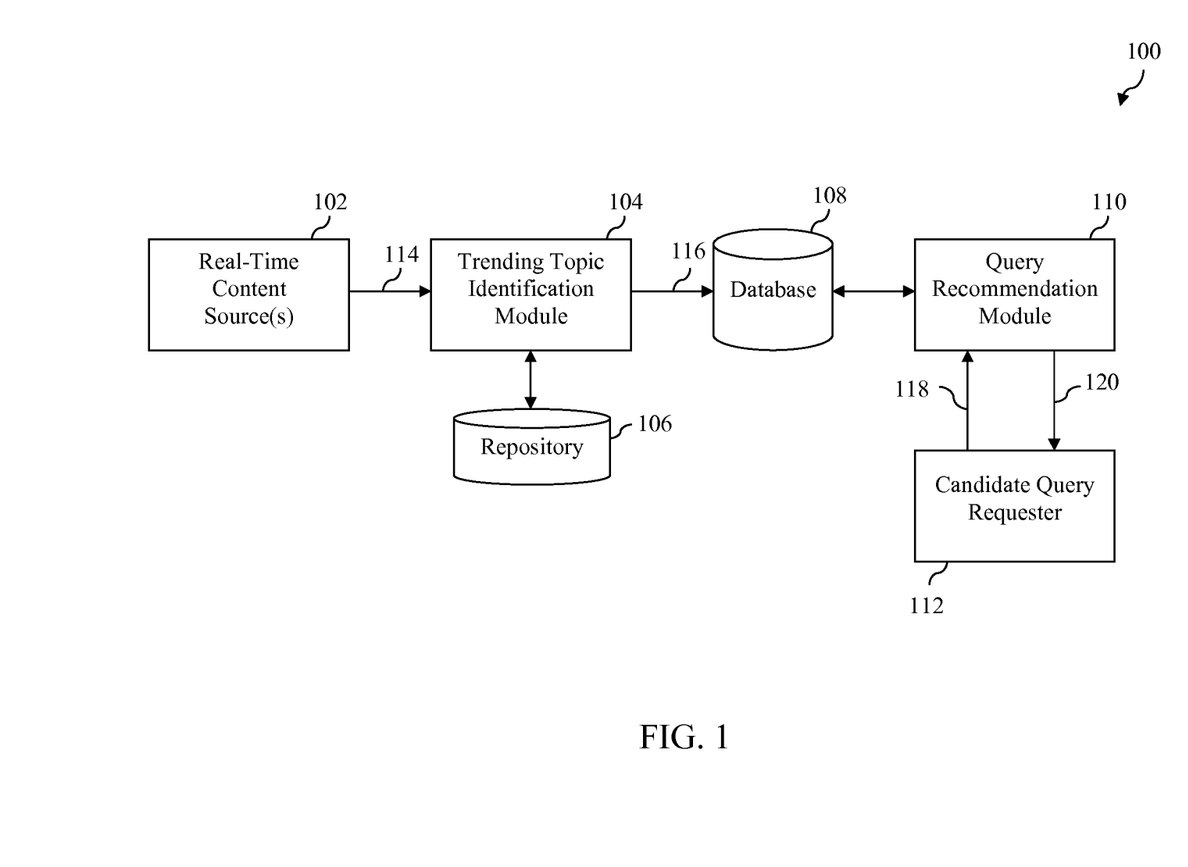
FIG. 1 is a block diagram of an example system for identifying and recommending trending query candidates associated with a given query in accordance with an embodiment.

II. Example System for Identifying Trending Topics and Suggesting Queries Related To Same FIG. 1 is a block diagram of an example system 100 for identifying and recommending trending query candidates associated with a given query in accordance with an embodiment. System 100 may be implemented, for example, in a networked computing environment. For example, system 100 may be implemented in a networked computing environment that operates to support a Web search engine, although this is only one example and is not intended to be limiting. Among other elements, system 100 includes a trending topic identification module 104, which may be thought of as an "offline" component of system 100, and a query recommendation module 110, which may be thought of as an "online" component of system 100.

As shown in FIG. 1, trending topic identification module 104 is configured to receive real-time content 114 from one or more real-time content sources 102. As used herein, the term "real-time content source" is intended to broadly encompass any data source that publishes or otherwise generates new information over time, and the term "real-time content" is intended to encompass any information published or otherwise generated by such a data source. Examples of real-time content 114 include, but are not limited to, user-generated content such as microblog posts (e.g., Twitter® posts) or social networking messages (e.g., Facebook® messages), articles published by news organizations, information from current events Web sites, or the like. In an embodiment, real-time content 114 produced by real-time content source(s) is received by trending topic identification module 104 as soon as it is generated or very shortly thereafter in order to ensure that trending topics can be determined in a timely fashion. Thus, in an embodiment, trending topic identification module 104 obtains time-sensitive information about current events from real-time content source(s) 102.

In an embodiment, trending topic identification module 104 receives real-time content 114 from a real-time content source 102 as a series of documents or other discrete information entities. A document may comprise, for example, and without limitation, a single microblog post, a single social networking message, a single news article, or the like. Each document may thus include text. Such real-time content is received in electronic form.

Trending topic identification module 104 may store received documents, metrics calculated and assigned to such documents and text entities included therein, and/or other information in a repository 106 that is communicatively connected to trending topic identification module 104. Repository 106 is intended to broadly represent any system or device capable of storing electronic information. In an embodiment in which trending topic identification module 104 receives large amounts of real-time content 114 from real-time content source(s) 102, repository 106 may comprise a distributed storage system, such as a cloud-based storage system. Of course, other suitable storage systems or devices may be used.

As will be described in more detail herein, trending topic identification module 104 is configured to analyze real-time content 114 received from real-time content source(s) 102 to identify a number of trending topics as well as to identify other information associated therewith. Such other information may include a list of words and named entities derived from real-time content 114 and associated probabilities that each such word or named entity is related to one of the trending topics. The identified trending topics and information associated therewith is then stored in a database 108 for subsequent use by query recommendation module 110. In an embodiment, trending topic identification module 104 stores the identified trending topics and information associated therewith in database 108 in the form of a data structure 116. Trending topic identification module 104 may be configured to perform the above-mentioned operations on a periodic basis so as to periodically provide a new data structure 116 for use by query recommendation module 110. This advantageously ensures that query recommendation module 110 is working with a fresh list of trending topics and associated information. Further information concerning the structure, function and operation of trending topic identification module will be provided herein in reference to FIGS. 2 and 3.

Database 108 is intended to broadly represent any organized collection of data stored in any suitable storage system or device. In an embodiment, system 100 also includes a database server (not shown in FIG. 1) that facilitates access to database 108 on behalf of a client, wherein a client may include, for example, trending topic identification module 104 and query recommendation module 110. However, this is only an example and is not intended to be limiting. Persons skilled in the relevant art(s) will readily appreciate that other means for accessing data in database 108 may be used.

As further shown in FIG. 1, query recommendation module 110 receives a query 118 from a candidate query requester 112 and returns one or more candidate queries 120 to candidate query requester 112 in response to receiving query 118. Candidate queries 120 comprise queries that may be submitted to a search engine or other information retrieval system in order to assist in obtaining information about currently trending topics that are related to query 118. Candidate query requester 112 is intended to broadly represent any automated entity that is capable of submitting query 118 to query recommendation module 110 and to receive candidate queries 120 therefrom. Candidate query requester 112 may comprise, for example, a component of a Web search engine or other search engine and query 118 may comprise a query recently submitted by a user of the search engine. As a further example, in an embodiment in which query recommendation module 110 comprises a part of a Web service, candidate query requester 112 may generally represent any client capable of utilizing such Web service. However, these examples are not intended to be limiting and still other components may operate to submit query 118 to query recommendation module 110 and receive candidate queries 120 therefrom.

As will be described in more detail herein, in one embodiment, query recommendation module 110 generates candidate queries 120 by comparing words and named entities derived from query 118 to words and named entities in data structure 116 stored in database 108. In particular, this process may involve identifying one or more trending topics from among the trending topics stored in data structure 116 that match (i.e., that are most related to) query 118, selecting named entities associated with the matching trending topics, and providing the selected named entities as candidate queries 120. Identifying matching trending topics may include, for each trending topic listed in data structure 116, summing a probability that each word and named entity in query 118 that also appears in data structure 116 is related to such topic. Further information concerning the structure, function and operation of query recommendation module 110 will be provided herein in reference to FIGS. 4 and 5.

Depending upon the implementation, each of trending topic identification module 104 and query recommendation module 110 may be implemented using a single computer or multiple interconnected computers. For example, where the volume of real-time content 114 is large, the operations of trending topic identification module 110 may be performed in a distributed fashion across a plurality of interconnected computers. Likewise, where the number of requesting entities and/or the quantity of queries received from such entities is large and low latency is desired, the operations of query recommendation module 110 may be performed in parallel by a plurality of computers. Example implementations of trending topic identification module 104 and query suggestion module 110 will now be described.

III. Example Trending Topic Identification Module And Method

Figure 2:
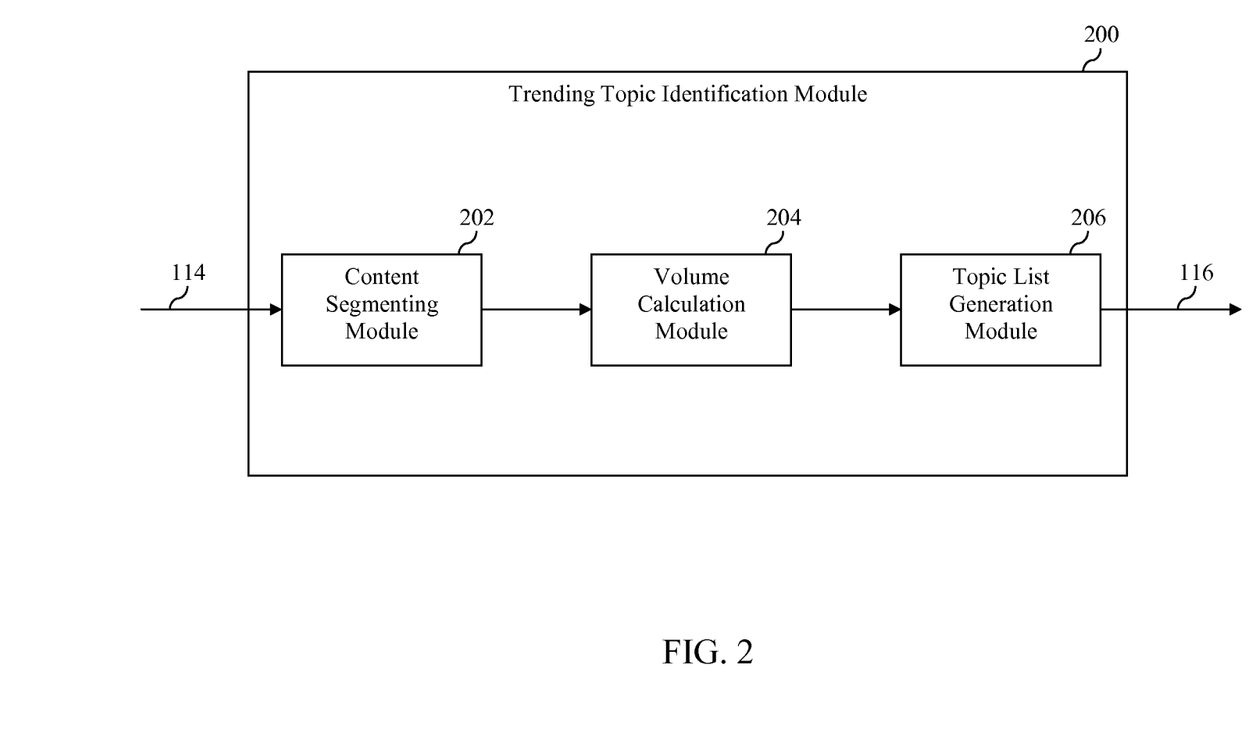
FIG. 2 is a block diagram of a trending topic identification module in accordance with an embodiment.

FIG. 2 is a block diagram of an example trending topic identification module 200 in accordance with an embodiment. Trending topic identification module 200 may comprise one implementation of trending topic identification module 104 described above in reference to FIG. 1. As such, trending topic identification module 104 is configured to analyze real-time content 114 received from real-time content source(s) 102 to identify a number of trending topics as well as to identify other information associated therewith. Such other information may include a list of words and named entities derived from real-time content 114 and associated probabilities that each such word or named entity is related to one of the trending topics. Trending topic identification module 200 then stores the identified trending topics and information associated therewith in database 108 for subsequent use by a query recommendation module, such as query recommendation module 110.

Trending topic identification module 200 is configured to operate in iterations having a fixed time interval. During each iteration, trending topic identification module 200 consumes a portion of real-time content 114 provided from real-time content source(s) 102 and processes such portion to generate a new version of data structure 116 that includes identified trending topics and information associated therewith. Trending topic identification module 200 may also store portions of real-time content 114 that were consumed during one or more previous iterations as well as analytic data generated during the processing of same in a repository connected thereto (such as repository 106 shown in FIG. 1). In an embodiment, trending topic information module 200 stores portions of real-time content 114 that were consumed during a historical time period of which the fixed time interval is a part, as well as analytic data generated during the processing of same. In particular embodiment, the fixed time interval is one hour and the historical time period is 24 hours. However, other time intervals and historical time periods may be used. In certain embodiments, the fixed time interval and historical time period are exposed as a configurable parameter to a system administrator, thereby allowing these parameters to be tuned to achieve desired performance.

As shown in FIG. 2, example trending topic identification module includes a content segmenting module 202, a volume calculation module 204 and a topic list generation module 206. As noted above, each of these components operates together to process a portion of real-time content 114 received during a fixed time interval to produce a new version of data structure 116. The manner in which each of these components operates to carry out this function will now be described.

Content segmenting module 202 receives a portion of real-time content 114 received during a fixed time interval and segments the received content into words and named entities. In an embodiment, the portion of real-time content 114 received by content segmenting module 202 comprises a plurality of documents, each of which includes text, and content segmenting module 202 operates to segment the document text into words and named entities. As used herein, the term "named entity" refers to phrases that contain the names of persons, organizations, locations, times and quantities. The term may also encompass other rigid designators commonly recognized as named entities by persons skilled in the art of named entity recognition (NER). As part of the segmenting process, content segmenting module 202 may normalize document text, performing functions such as stemming and removing words that do not provide information (e.g., "the," "a," or the like). By way of example, content segmenting module 202 may receive a document that includes the text "Derek Jeter signing new contract with Yankees" and segment the text into the words "sign," "new" and "contract" and the named entities "Derek Jeter" and "Yankees." Content segmenting module 202 may store the words and named entities and an identification of the document(s) they are associated therewith in a repository (e.g., repository 106).

Volume calculation module 204 processes the words and named entities produced by content segmenting module 202 for the current time interval to calculate a volume for each of a predefined number of topics for the current interval. Volume calculation module 204 performs this function, in part, by applying a probabilistic topic model to the words and named entities produced by content segmenting module 202 for the current time interval. The probabilistic topic model may comprise, for example, a standard probabilistic topic model such as Latent Dirichlet Allocation (LDA) or Probabilistic Latent Semantic Analysis (PLSA). However, other suitable standard or non-standard probabilistic topic models may be used. By applying the probabilistic topic model in this manner, volume calculation module 204 generates: (i) a probability that each word or named entity produced by content segmenting module 202 for the current time interval belongs to each one of the predefined number of topics; and (ii) a probability that each document received during the current time interval is related to each of the predefined number of topics.

As will be appreciated by persons skilled in the relevant art(s), the number of topics in the predefined number of topics determines the granularity of topical clustering that will be applied to the words, named entities and documents received during the current time interval. In one embodiment, the predefined number of topics is exposed as a configurable parameter to a system administrator, thereby allowing this parameter to be tuned to achieve a desired performance.

Volume calculation module 204 then uses the results of the application of the probabilistic topic model to calculate a volume for each of the predefined number of topics for the current time interval. In one embodiment, volume calculation module 204 performs this function by, for each of the predefined number of topics, summing the probabilities that each document received during the current time interval is related to the topic. Still other methods may be used to determine a volume for each of the predefined number of topics for the current time interval.

Once volumes have been calculated for each of the predefined number of topics for the current time interval by volume calculation module 204, topic list generation module 206 compares the current interval volume to a mean volume calculated over a historical time period for each of the predefined number of topics to calculate a deviation for each of the predefined number of topics. The calculated deviation for each of the predefined number of topics comprises the trending score for the topic. In one embodiment, topic list generation module 206 determines the mean volume for each of the predefined number of topics over the historical time period by, for each of the predefined number of topics, taking an average of the determined volumes for that topic over all of the time intervals within the historical time period. Still other methods may be used to determine a mean volume for each of the predefined number of topics over the historical time period.

The foregoing presents only one particular approach for determining a trending score associated with each topic in the predefined number of topics. It is noted that in alternate embodiments the trending score for each topic may be determined in ways that do not require calculation of a mean volume for each topic. For example, trending scores may be obtained using any of a variety of well-known mathematical methods for identifying the peak and/or slope of a volume graph associated with each topic, or for identifying other indicators from which trends can be identified. Furthermore, methods like noise smoothing can also be applied to improve accuracy.

Topic list generation module 206 then compares the trending score obtained for each of the predefined number of topics (i.e., the deviation measure obtained for each of the predefined number of topics) to a threshold value. This threshold value may be fixed during development time, configured by a system administrator, or adaptively determined by topic list generation module 206 based on any of a variety of factors. For example, if a comparison of trending scores to a threshold leads to a less than desirable number of trending topics, topic list generation module 206 may adjust the threshold score to generate more trending topics.

If topic list generation module 206 determines that a topic in the predefined number of topics has a trending score that exceeds the threshold value, then topic list generation module 206 will add the topic to a list of trending topics included in data structure 116. Topic list generation module also includes the words and named entities associated with these trending topics in data structure 206 along with the probabilities that such words and named entities related to each of the trending topics. Topic list generation module 206 then stores data structure 116 in a database, such as database 108 of FIG. 1, for subsequent use by a query recommendation module, such as query recommendation module 110 of FIG. 1.

Figure 3:
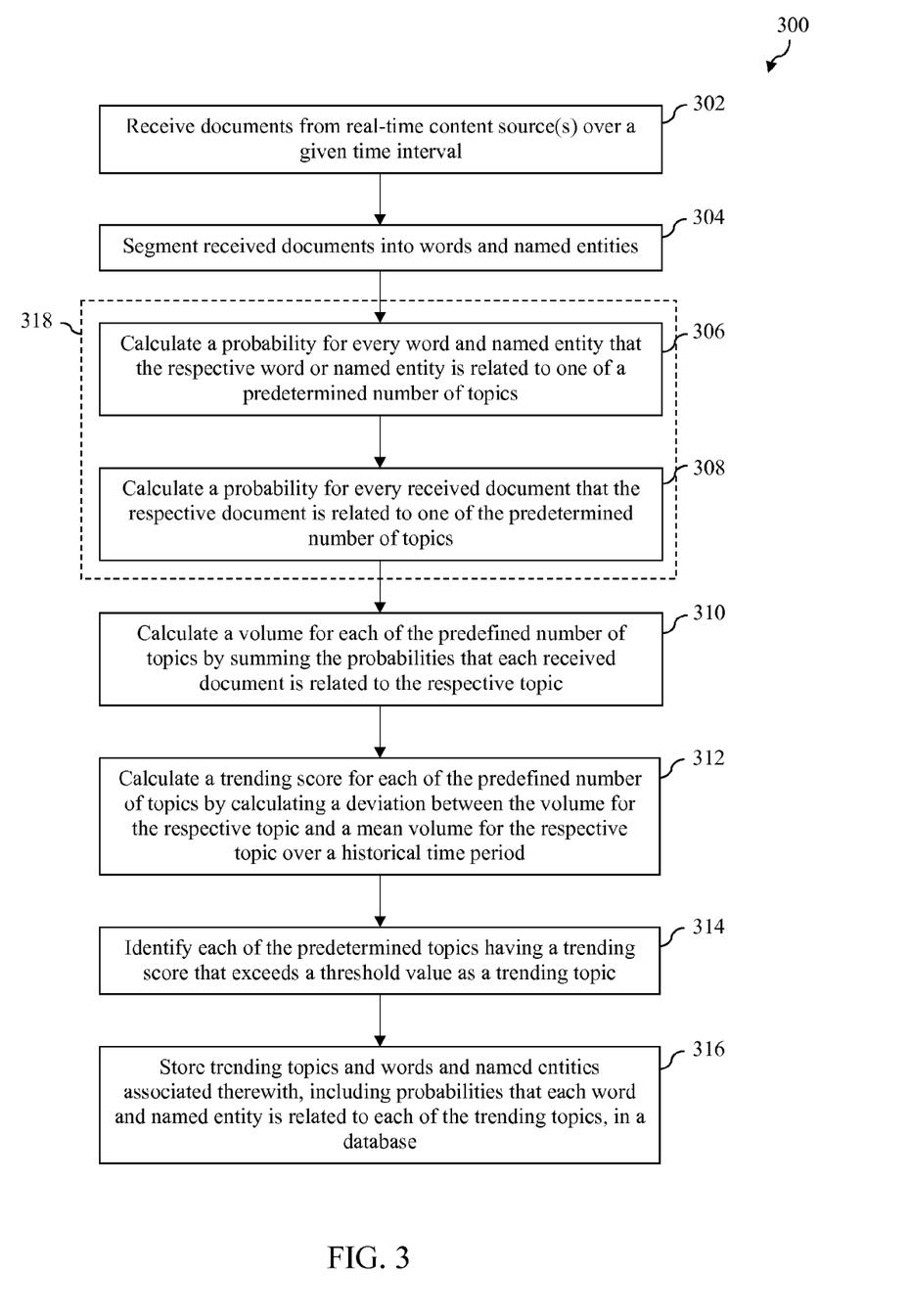
FIG. 3 depicts a flowchart of a method for identifying trending topics based on content received from one or more real-time data sources in accordance with an embodiment.

FIG. 3 depicts a flowchart 300 of a method for identifying trending topics based on content received from one or more real-time data sources in accordance with an embodiment. The method of flowchart 300 may be implemented by trending topic generation module 104 as described above in reference to FIG. 1 or trending topic generation module 200 as described above in reference to FIG. 2. However, the method is not limited to those implementations and may be performed by other entities entirely. Further structural and operational embodiments will be apparent to persons skilled in the relevant art(s) based on the following description of flowchart 300.

As shown in FIG. 3, the method of flowchart 300 begins at step 302 in which documents are received from one or more real-time content sources over a given time interval.

At step 304, the received documents are segmented into words and named entities.

At step 306, a probability is calculated for every word and named entity that the respective word or named entity is related to one of a predetermined number of topics.

At step 308, a probability is calculated for every received document that the respective document is related to one of the predetermined number of topics.

As discussed above, in one embodiment, step 306 and step 308 are performed as part of the application of probabilistic topic model to the words and named entities produced during step 304. For example, step 306 and step 308 may be performed as a result of the processing of the words and named entities produced during step 204 by an LDA topic generator. In accordance with such an embodiment, the operations of step 306 and step 308 may be thought of as being part of a single step 318 as shown in FIG. 3.

At step 310, a volume is determined for each of the predetermined number of topics by summing the calculated probabilities that each received document is related to the respective topic.

At step 312, a trending score is calculated for each of the predefined number of topics by calculating a deviation between the volume for the respective topic determined during step 310 and a mean volume for the respective topic over a historical time period.

At step 314, each of the predetermined topics having a trending score that exceeds a threshold value is identified as a trending topic.

At step 316, the trending topics identified during step 314 and the words and named entities associated therewith, including probabilities that each word and named entity is related to each of the trending topics, is stored in a database. Such database may be used by a query recommendation module, such as query recommendation module 110 of FIG. 1.

IV. Example Query Recommendation Module And Method

Figure 4:
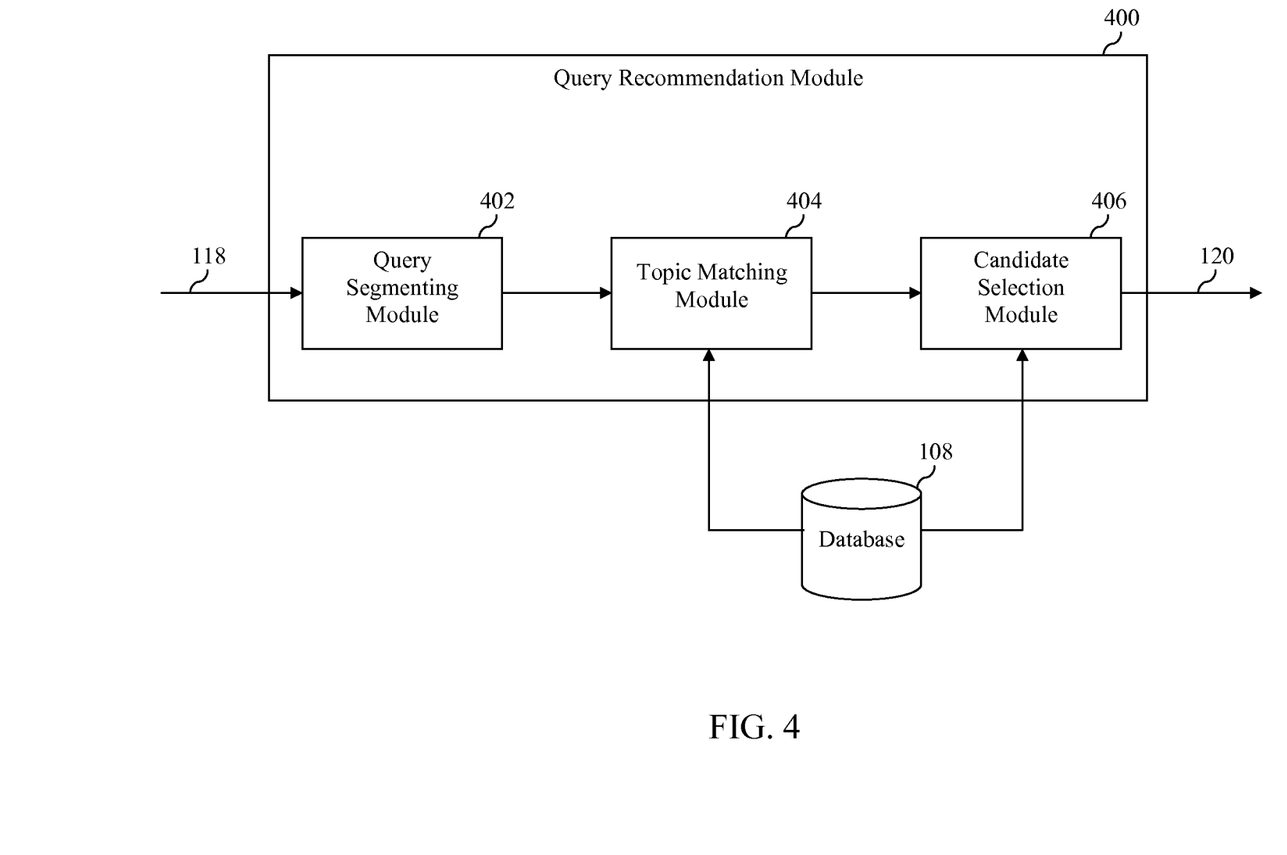
FIG. 4 is a block diagram of a query recommendation module in accordance with an embodiment.

FIG. 4 is a block diagram of an example query recommendation module 400 in accordance with an embodiment. Query recommendation module 400 may comprise one implementation of query recommendation module 110 described above in reference to FIG. 1. As such, query recommendation module 400 may be configured to receive query 118 and to generate candidate queries 120 by comparing words and named entities derived from received query 118 to words and named entities in data structure 116 stored in database 108. As shown in FIG. 4, query recommendation module 400 includes a query segmenting module 402, a topic matching module 404 and a candidate selection module 406. These elements of query generation module 400 are described as follows.

Query segmenting module 402 is configured to receive query 118 and to segment query 118 into words and named entities. The segmenting process may be similar to that used by content segmenting module 202 as described above in reference to FIG. 2. As part of the segmenting process, query segmenting module 402 may normalize the text of query 118, performing functions such as stemming and removing words that do not provide information (e.g., "the," "a," or the like).

Topic matching module 404 is configured to identify one or more trending topics from among the trending topics stored in data structure 116 that match (i.e., that are most related to) the words and named identifies of query 118 identified during step 402. To perform this function, topic matching module 404 accesses data structure 116 in database 108 as shown in FIG. 4. In particular, topic matching module 404 identifies words and named entities of query 118 that also appear in data structure 116 and then, for each of the trending topics identified in data structure 116, sums the probability that each word or named entity appearing in query 118 and also in data structure 116 belongs to the respective topic, thereby generating a relevance value for the respective topic.

Topic matching module 404 then sorts the trending topics stored in data structure 116 by the relevance value calculated for each such trending topic in descending order. Topic matching module 404 then compares the relevance values for each trending topic to a threshold value associated with topic relevance and discards any trending topics having sums that do not exceed the threshold value. The trending topics having sums that do exceed the threshold value are deemed matching trending topics. In one embodiment, if topic matching module 404 does not identify any matching trending topics, then query recommendation module 400 will not return any recommended queries 120.

Candidate selection module 406 is configured to operate when one or more matching trending topics are identified by topic matching module 404. For each of the matching trending topics, candidate selection module 406 obtains the associated named entities from data structure 116 and sorts such named entities by the probabilities associated therewith that such named entities relate to the matching trending topic in descending order. Candidate selection module 406 then selects one or more of the top-most sorted named entities and outputs such selected named entities as one or more of candidate queries 120. In one embodiment, candidate selection module 406 only selects named entities that do not exist in query 118, since such named entities may be deemed redundant to query 118.

Figure 5:
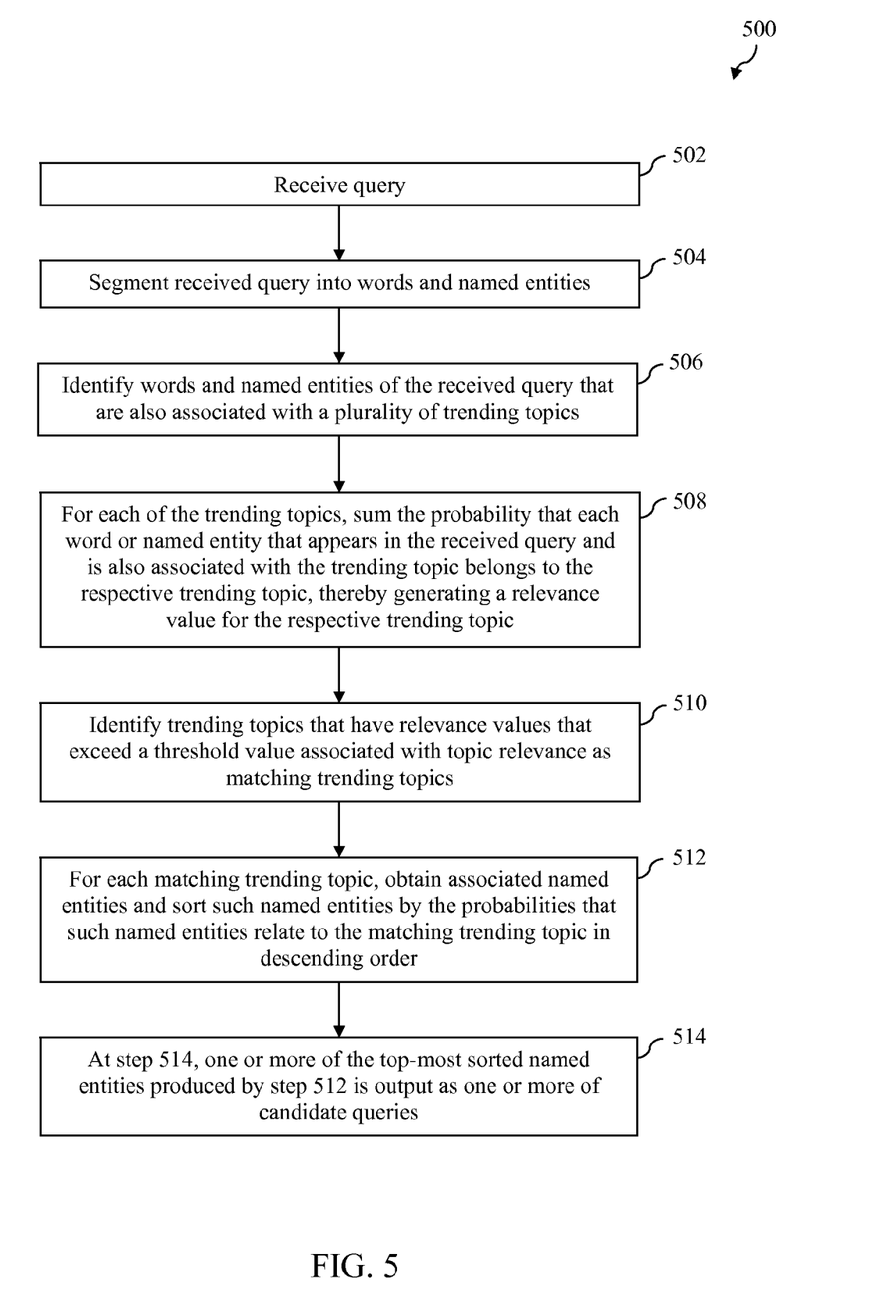
FIG. 5 depicts a flowchart of a method for generating candidate queries based on a received query in accordance with an embodiment.

FIG. 5 depicts a flowchart 500 of a method for generating candidate queries based on a received query in accordance with an embodiment. The method of flowchart 500 may be implemented by query recommendation module 110 as described above in reference to FIG. 1 or query recommendation module 400 as described above in reference to FIG. 4. However, the method is not limited to those implementations and may be performed by other entities entirely. Further structural and operational embodiments will be apparent to persons skilled in the relevant art(s) based on the following description of flowchart 500.

As shown in FIG. 5, flowchart 500 begins at step 502 in which a query, such as a user query, is received.

At step 504, the received query is segmented into words and named entities.

At step 506, words and named entities of the received query that are also associated with a plurality of trending topics are identified.

At step 508, for each of the trending topics, the probability that each word or named entity that appears in the received query and is also associated with the trending topics belongs to the respective trending topic is summed, thereby generating a relevance value for the respective trending topic At step 510, trending topics that have relevance values that exceed a threshold value associated with topic relevance are identified as matching trending topics.

At step 512, for each matching trending topic, named entities associated therewith are obtained and such named entities are sorted by the probabilities that such named entities relate to the matching trending topic in descending order.

At step 514, one or more of the top-most sorted named entities produced by step 512 is output as one or more of the candidate queries.

In certain implementations, candidate queries 120 returned by query recommendation module 110 or query recommendation module 400 are presented to a user that submitted query 118 to a search engine, such as a Web search engine. In accordance with such implementations, candidate query requester 112 of FIG. 1 may comprise the Web search engine and may include a user interface module for presenting the candidate queries to the user of the Web search engine.

Figure 6:
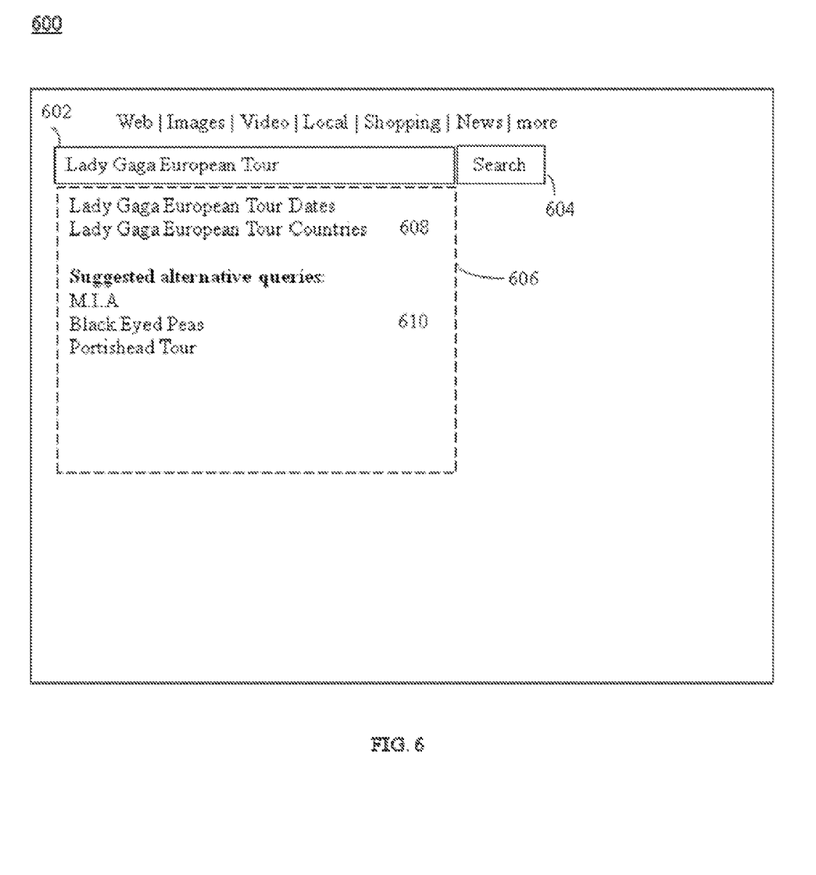
FIG. 6 shows a search page of a Web search engine in which candidate queries determined in accordance with the techniques described herein may be presented to a user.

For example, FIG. 6 shows a search page 600 of a Web search engine in which candidate queries determined in accordance with the techniques described herein may be presented to a user. As shown in FIG. 6, search page 600 includes a query input field 602, a search button 604, and a search assist field 606. Search assist field 606 may be any field that recommends queries to users that input queries into query input field 602. In search page 600, search assist field 606 includes standard assisted queries 608 and query candidates 610. For example, when a user inputs a search query of "Lady Gaga European Tour" into query input field 602, search assist field 606 is populated with standard assisted queries 608, such as a continuation, "Lady Gaga European Tour Dates," as well as query candidates 610 as determined by the techniques described herein, such as "Black Eyed Peas." Of course, query candidates 610 may be presented without standard assisted queries 608, or may be presented in other ways.

Figure 7:
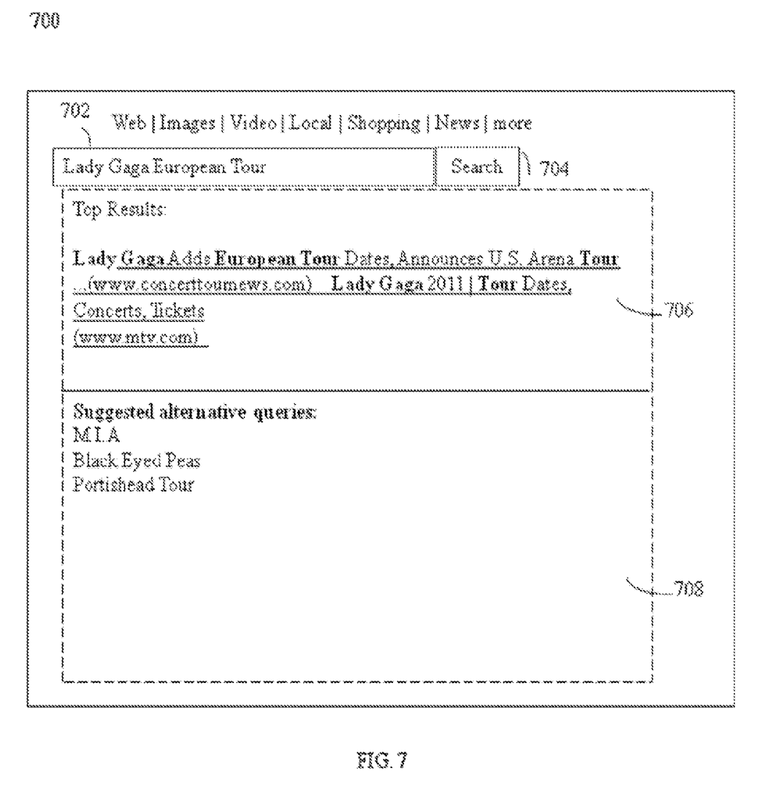
FIG. 7 shows a search results page of a Web search engine in which candidate queries determined in accordance with the techniques described herein may be presented to a user.

As another example, FIG. 7 shows a search results page 700 of a Web search engine in which candidate queries determined in accordance with the techniques described herein may be presented to a user. As shown in FIG. 7, search results page 700 includes a query input field 702, a search button 704, a search results field 706, and a suggested query field 708. In search results page 700, search results field 706 includes results of the query "Lady Gaga European Tour" entered into query input field 702, and suggested query field 708 includes query candidates, such as "M.I.A," which have been determined in accordance with the techniques described herein.

As discussed above, however, embodiments described herein may be used in to generate candidate queries for use in contexts other than Web pages associated with Web search engines. Thus, the examples provided above in reference to FIGS. 6 and 7 are provided for illustration only and are not intended to be limiting.

V. Example Computer System Implementation

Trending topic identification module 104, query recommendation module 110, candidate query requester 112, and modules contained therein may be implemented in hardware, software, firmware, or any combination thereof. For example, trending topic identification module 104, query recommendation module 110, candidate query requester 112, and modules contained therein may be implemented as computer program code configured to be executed in one or more processors. Alternatively, topic identification module 104, query recommendation module 110, candidate query requester 112, and modules contained therein may be implemented as hardware logic/electrical circuitry.

Figure 8:
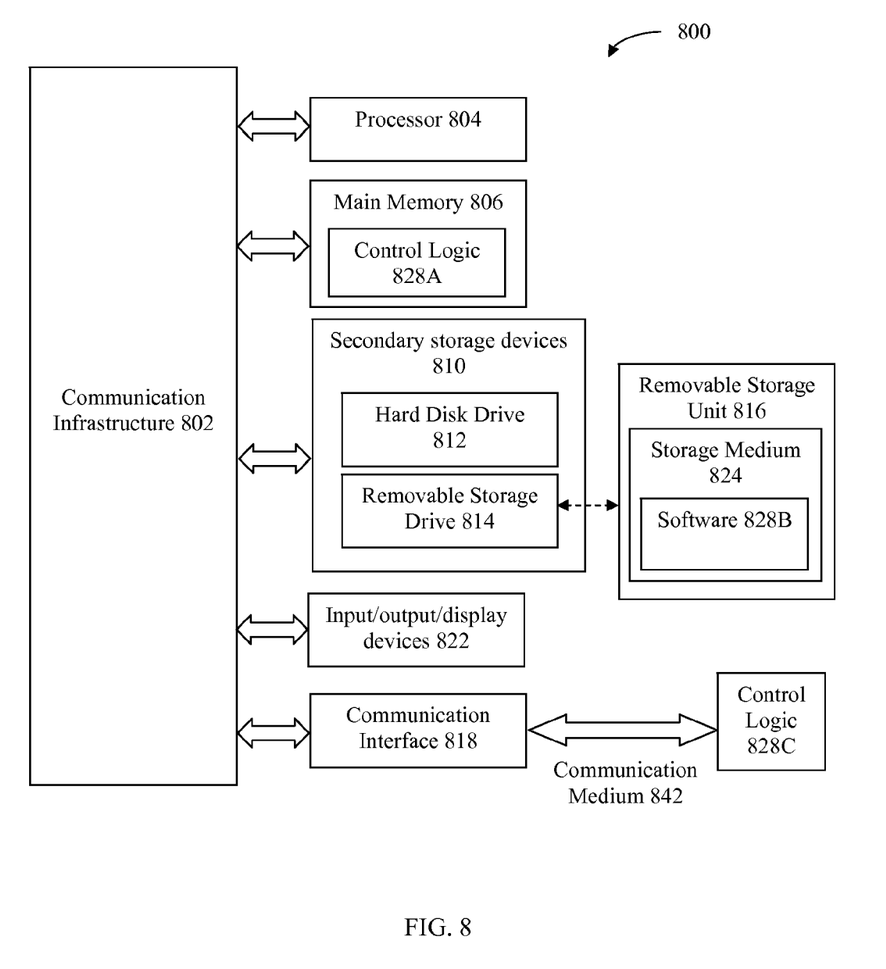
FIG. 8 is a block diagram of an example computer system that may be used to implement embodiments described herein.

The embodiments described herein, including systems, methods/processes, and/or apparatuses, may be implemented using well known servers/computers, such as a computer 800 shown in FIG. 8. For example, topic identification module 104, query recommendation module 110, candidate query requester 112, and modules contained therein may be implemented using one or more computers 800.

Computer 800 can be any commercially available and well known computer capable of performing the functions described herein, such as computers available from International Business Machines, Apple, Sun, HP, Dell, Cray, etc. Computer 800 may be any type of computer, including a desktop computer, a server, etc.

Computer 800 includes one or more processors (also called central processing units, or CPUs), such as a processor 804. Processor 804 is connected to a communication infrastructure 802, such as a communication bus. In some embodiments, processor 804 can simultaneously operate multiple computing threads.

Computer 800 also includes a primary or main memory 806, such as random access memory (RAM). Main memory 806 has stored therein control logic 828A (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 800 also includes input/output/display devices 822, such as monitors, keyboards, pointing devices, etc.

Computer 800 further includes a communication or network interface 818. Communication interface 818 enables the computer 800 to communicate with remote devices. For example, communication interface 818 allows computer 800 to communicate over communication networks or mediums 842 (representing a form of a computer useable or readable medium), such as LANs, WANs, the Internet, etc. Network interface 818 may interface with remote sites or networks via wired or wireless connections.

Control logic 828C may be transmitted to and from computer 800 via the communication medium 842.

Any apparatus or manufacture comprising a computer useable or readable medium having control logic (software)

stored therein is referred to herein as a computer program product or program storage device. This includes, but is not limited to, computer 800, main memory 806, secondary storage devices 810, and removable storage unit 816. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for Trending topic identification module 104, query recommendation module 110, candidate query requester 112, and modules contained therein, flowchart 300, and/or flowchart 500 (including any one or more steps of the flowcharts), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system having at least one processor, storage, and a communication platform connected to a network for identifying candidate queries related to a trending topic, the system comprising:
   a trending topic identification module that is configured to identify topics trending in one or more real-time content sources, wherein the trending topic identification module comprises:
      a content segmenting module that is configured to segment received documents from the one or more real-time content sources into words and named entities,
      a volume calculation module that is configured to calculate a volume for each of a predetermined number of topics by organizing the received documents into two or more portions of documents each defined by a time interval within a historical time period and, for each portion:
         calculating a probability for every word and named entity within the portion that the respective word or named entity is related to one of the predetermined number of topics,
         calculating a probability for every document within the portion that the respective document is related to one of the predetermined number of topics, and
         determining a volume for each of the predetermined number of topics by summing the calculated probabilities that each document is related to the respective topic, and
      a topic list generation module that is configured to generate a list of trending topics based on the calculated volumes for the predetermined number of topics; and
   a query recommendation module that is configured to suggest at least one candidate query in response to receiving a user query, wherein the at least one candidate query is obtained by comparing words and named entities of the user query with words and named entities associated with the identified topics.

2. The system of claim 1, wherein:
   the topic list generation module is configured to generate the list of trending topics by, for every one of the predetermined number of topics:
      calculating a mean volume by taking an average of the determined volumes for every portion within the historical time period; and
      calculating a deviation between a determined volume associated with a portion defined by a most recent time interval of the historical time period to the mean volume; and
      identifying one of the predetermined number of topics as a trending topic when the topic is associated with a determined volume that has a calculated deviation from the mean volume that exceeds a threshold value.

3. The system of claim 1, wherein the query recommendation module includes:
   a query segmenting module that is configured to segment the received user query into words and named entities;
   a topic matching module that is configured to sum probabilities assigned to the words and named entities of the received user query and stored in association with the identified topics to determine relevance values for the each of the identified topics with respect to the words and named entities of the received user query, to compare each of the relevance values to a threshold value associated with topic relevance, and to select topics from among the identified topics that are associated with relevance values that satisfy the threshold value.

4. The system of claim 3, further comprising a candidate selection module that is configured to, for at least one selected topic:
   sort the named entities stored in association with the selected topic by probabilities that such named entities are related to the selected topic;
   select one or more of the top-sorted named entities that do not appear in the received user query; and
   provide the one or more selected top-sorted named entities that do not appear in the received user query as one or more candidate queries.

5. The system of claim 1, further comprising a user interface module that presents the at least one candidate query to a user.

6. The system of claim 5, wherein the user interface module presents the at least one candidate query to the user via a search page of a search engine.

7. The system of claim 6, wherein the user interface module presents the at least one candidate query to the user via a search results page of a search engine.

8. The system of claim 1, wherein the real-time content source(s) includes one or more of:
a source of microblog posts;
a source of social networking messages;
a source of news articles; and
a source of information from a current events web site.

9. A method for identifying candidate queries related to a trending topic based on a user query, the method comprising:
generating a data structure that includes entries relating trending topics with words and named entities located in content of one or more real-time content sources by
receiving documents from the one or more real-time content sources,
segmenting the received documents into words and named entities,
organizing the received documents into two or more portions of documents each defined by a time interval within a historical time period,
determining a volume for each of a predetermined number of topics, and for each of the predetermined number of topics:
calculating a mean volume by taking an average of the determined volumes for every portion within the historical time period,
calculating a deviation between a determined volume associated with a portion defined by a most recent time interval of the historical time period to the mean volume, and
identifying one of the predetermined number of topics as a trending topic when the topic is associated with a determined volume that has a calculated deviation from the mean volume that exceeds a threshold value;
storing the generated data structure in a database accessible to a query suggestion module;
receiving a user query at the query recommendation module;
matching contents of the received user query to one or more of the trending topics stored within the database;
retrieving one or more named entities associated with the matched one or more trending topics; and
returning the retrieved one or more named entities associated with the matched one or more trending topics.

10. The method of claim 9, wherein generating the data structure that includes entries relating trending topics with words and named entities located in content of the one or more real-time content sources further comprises:
for each portion:
calculating a probability for every word and named entity within the portion that the respective word or named entity is related to one of the predetermined number of topics;
calculating a probability for every document within the portion that the respective document is related to one of the predetermined number of topics; and
determining the volume for each of the predetermined number of topics by summing the calculated probabilities that each document is related to the respective topic;
updating the data structure with entries for identified trending topics and the probability that each word and named entity within the portion is related to each of the identified trending topics.

11. The method of claim 9, wherein storing the generated data structure in a database accessible to the query recommendation module includes:
storing a first data structure associated with a first time interval in which the content of the real-time content source(s) is received; and
replacing the first data structure with a second data structure associated with a second time interval in which the content of the real-time content source(s) is received.

12. The method of claim 9, wherein receiving the user query at the query recommendation module comprises receiving a user query from a search engine.

13. The method of claim 9 wherein matching contents of the received user query to one or more of the trending topics stored within the database includes:
segmenting the received user query into words and named entities;
summing probabilities assigned to the words and named entities of the received user query and stored in association with the one or more trending topics within the database to determine relevance values for the one or more trending topics with respect to the words and named entities of the received user query;
comparing each of the relevance values to a threshold value associated with topic relevance; and
selecting trending topics associated with relevance values that satisfy the threshold value.

14. The method of claim 9, wherein retrieving the one or more named entities associated with the matched one or more trending topics comprises, for at least one matched trending topic:
sorting the named entities associated with the matched trending topic by probabilities that such named entities are related to the matched trending topic;
selecting one or more of the top-sorted named entities that do not appear in the received user query.

15. The method of claim 9, wherein returning the retrieved one or more named entities associated with the matched one or more trending topics comprises:
returning the retrieved one or more named entities associated with the matched one or more trending topics to a search engine for inclusion in a search page.

16. The method of claim 9, wherein returning the retrieved one or more named entities associated with the matched one or more trending topics comprises:
returning the retrieved one or more named entities associated with the matched one or more trending topics to a search engine for inclusion in a search results page.

17. The method of claim 9, wherein the method is implemented as a Web service and returning the retrieved one or more named entities associated with the matched one or more trending topics comprises:
returning the retrieved one or more named entities associated with the matched one or more trending topics to a client of the web service.

18. A machine-readable tangible and non-transitory medium having information for identifying candidate queries related to a trending topic, wherein the information, when read by the machine, causes the machine to perform the following:
receiving a user query;
matching contents of the received user query to one or more trending topics stored within a database, the trending topics being identified based on an analysis of content of one or more real-time content sources by
    receiving documents from the one or more real-time content sources,
    segmenting the received documents into words and named entities,
    organizing the received documents into two or more portions of documents each defined by a time interval within a historical time period,
    determining a volume for each of a predetermined number of topics, and for each of the predetermined number of topics:
        calculating a mean volume by taking an average of the determined volumes for every portion within the historical time period,
        calculating a deviation between a determined volume associated with a portion defined by a most recent time interval of the historical time period to the mean volume, and
        identifying one of the predetermined number of topics as a trending topic when the topic is associated with a determined volume that has a calculated deviation from the mean volume that exceeds a threshold value;
retrieving one or more named entities stored in association with the matched one or more trending topics; and
returning the retrieved one or more named entities.

19. The medium of claim 18, wherein matching contents of the received user query to one or more trending topics stored within a database comprises:
    segmenting the received user query into words and named entities;
    calculating a sum of probabilities assigned to the words and named entities of the received user query and stored in association with the one or more trending topics within the database to determine relevance values for the one or more trending topics with respect to the words and named entities of the received user query;
    comparing each of the relevance values to a threshold value; and
    selecting trending topics associated with relevance values that satisfy the threshold value.

20. The medium of claim 18, wherein retrieving one or more named entities comprises:
    sorting the named entities associated with at least one matched trending topic by probabilities that such named entities are related to the matched trending topic; and
    selecting one or more of the top-sorted named entities that do not appear in the received user query.

21. The system of claim 1, wherein the at least one candidate query is different from a continuation of the user query.

* * * * *